US009196125B2

(12) United States Patent
De Viveiros Ortiz

(10) Patent No.: US 9,196,125 B2
(45) Date of Patent: Nov. 24, 2015

(54) GAMING MACHINE AND METHODS OF PLAYING A GAME INCLUDING A SKILL-BASED TARGET GAME

(71) Applicant: Zitro IP S.ar.l, Luxembourg (LU)

(72) Inventor: Johnny De Viveiros Ortiz, Madrid (ES)

(73) Assignee: ZITRO IP S.AR.L., Luxembourg ( * ) Notice: Subject to any disclaimer, the term of this patent is extended or adjusted under 35 U.S.C. 154(b) by 153 days.

(21) Appl. No.: 13/904,991

(22) Filed: May 29, 2013

(65) Prior Publication Data

US 2013/0324222 A1 Dec. 5, 2013

Related U.S. Application Data

(60) Provisional application No. 61/652,721, filed on May 29, 2012.

(51) Int. Cl.
*A63F 13/00* (2014.01)
*G07F 17/32* (2006.01)

(52) U.S. Cl.
CPC ........ *G07F 17/3267* (2013.01); *G07F 17/3295* (2013.01)

(58) Field of Classification Search
CPC ............ G07F 17/3244; G07F 17/3248; G07F 17/3253
USPC ........................................ 463/16, 20, 25, 31
See application file for complete search history.

(56) References Cited

U.S. PATENT DOCUMENTS

| | | | | |
|---|---|---|---|---|
| 2005/0181860 | A1 * | 8/2005 | Nguyen et al. | 463/20 |
| 2006/0040717 | A1 * | 2/2006 | Lind et al. | 463/7 |
| 2006/0128468 | A1 * | 6/2006 | Yoshikawa et al. | 463/36 |
| 2011/0218035 | A1 * | 9/2011 | Thomas | 463/25 |
| 2012/0034968 | A1 | 2/2012 | Watkins et al. | |
| 2012/0115581 | A1 | 5/2012 | Englman et al. | |

OTHER PUBLICATIONS

Angry Birds video game, Published by Rovio (2009)—as evidenced by www.wikihow.com/play-angry-birds.*

* cited by examiner

*Primary Examiner* — James S McClellan
(74) *Attorney, Agent, or Firm* — Newman Law, LLC

(57) ABSTRACT

A method of allowing a player to play a game on a gaming machine is described herein. The method includes allowing a player to make a wager associated with a primary wagering game, randomly generating an outcome of the primary game and providing a primary game award based on the primary game outcome. The method also includes displaying a secondary skill-based game including a plurality of targets and a plurality of player-selectable items for use in contacting the plurality of targets, allowing the player to select an item from the player-selectable items and a movement associated with the selected item, determining an outcome of the secondary skill-based game as a function of the selected item and the selected item movement, and displaying the skill-based game outcome including a simulated movement of the item in which the item either contacts a target or does not contact a target.

19 Claims, 9 Drawing Sheets

GAMING MACHINE AND METHODS OF PLAYING A GAME INCLUDING A SKILL-BASED TARGET GAME

CROSS-REFERENCE TO RELATED APPLICATIONS

This application claims the benefit of U.S. Provisional Application No. 61/652,721, filed May 29, 2012, the disclosure of which is incorporated herein by reference.

COPYRIGHT NOTICE

The figures included herein contain material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

TECHNICAL FIELD

The subject matter disclosed herein relates generally to gaming machines and more particularly, to an apparatus and method for allowing players to play a wagering game with a bonus game including a skill-based target game.

BACKGROUND OF THE INVENTION

At least some known gaming machines display video based wagering game such as bingo-type games that allow players to play a game and wager on the outcome of the game. During play of known video bingo-type games, the player purchases one or more bingo-type cards for use in playing the bingo-type game. Each bingo card includes a randomly selected sub-set of numbers from a pre-defined set of numbers. The gaming machine conducts a draw wherein the gaming machine randomly selects a plurality of numbers from the predefined set of numbers. During the draw, the gaming machine or the player compare the drawn number with the numbers displayed on the player's bingo cards to determine if a match occurs on the bingo cards. The player and/or gaming machine mark, or daub, each corresponding number on the player's card matching a selected number. The gaming machine provides an award to the player if a predefined number of matches occur in the player's card and/or if the matched numbers form a predefined pattern on the player's card.

Over time, during game play, the player may become frustrated because the chances of receiving an award are based only on the number of matches made between the numbers selected during the draw and the predefined set of numbers displayed in the player's bingo card. Accordingly, new features are necessary to appeal to player interest and enhance excitement in order to entice longer play and increased profitability. The present invention is directed to satisfying these needs.

SUMMARY OF THE INVENTION

According to one aspect of the present invention, a wagering game system hereinafter an electronic gaming system, is configured to carry on at least a main game whilst performing the necessary actions to provide a bonus game on a display on the electronic gaming system.

The wagering game system or electronic gaming system is configured to conduct a wagering game that itself includes at least one display device and at least one user input device, as well as one or more processors operatively associated with the wagering game machine. The one or more processors are configured to perform, responsive to instructions stored on one or more physical memory devices, the acts of randomly determining an outcome of a base wagering game, determining if a trigger condition for a skill-based game feature is satisfied by the outcome of the base wagering game, providing an option to accept the skill-based game feature or to decline the skill-based game feature in favor of a non-skill based game feature, and executing the skill-based game feature responsive to an instruction to accept the skill-based game feature.

The embodiments of the present invention are directed to systems and methods for providing a combined skill-based and wagering bonus game on an electronic device, such as an electronic gaming machine (EGM) or other electronic platform. The user input for directing or controlling the selected item in the skill-based game may include signals received from any communication device, including depressible buttons, joysticks, controllers, touch-enabled display screens or the like.

In a preferred embodiment, the invention is directed to a method of providing a bonus game in addition to an underlying game through an EGM having a processor, memory, communication device and display device, the bonus game including the steps of: providing a display of a plurality of items; receiving a user selection relating to one of the plurality of items; displaying the selected item as part of an at least partially skill-based target game, wherein one or more targets are displayed; receiving user input relating to movement of the selected item in the skill-based target game; displaying simulated movement of the selected item pursuant to the user input received to reveal an outcome of the skill-based target game in which the selected item is displayed as either contacting a target or not contacting a target.

The aforementioned method further may include displaying a simulated two-dimensional or three-dimensional environment in which the target game is played. The selected items and one or more targets may be displayed as two or three dimensional objects in the target game environment.

Depending on the outcome of the target game the aforementioned method may include the step of providing an award of credits in the underlying game. The credits in the underlying game may be used to activate a bonus game after a preset amount of the credits is achieved whilst the aforementioned method may provide a wager of at least a portion of credits earned in the underlying game, wherein the wager is resolved by the outcome of the target game.

In some embodiments, the aforementioned method further includes the step of receiving a portion of credits in return for a selection of an item. Each item of the plurality may be associated with a different purchase price which requires receiving a corresponding amount of credits for use of the item in the target game. The target game may be any simulated game in which a user may attempt to direct an item to contact a target such as, for example, a throwing game, a shooting game, a launching game, an archery game, a bowling game, and/or a jumping game. The user input for controlling the simulated movement may involve directing the simulated angle, velocity, force or direction of movement in a two-dimensional or three-dimensional environment.

In some embodiments, the aforementioned method further includes the step of displaying a plurality of targets in the target game, wherein each target of the plurality of targets may be associated with a different award or credit amount and each item may be associated with different characteristics of simulated movement in the target game. The award is determined at least partially by the selected item and specific target the selected item contacts.

The invention is also directed to an electronic game system for providing methods as described above, which may be partially or wholly carried out in a variety of ways and/or through a variety of systems and devices, which may include, but are not limited to, an EGM for one or more players, standalone multiplayer platforms which may include a player interface such as a touch screen display, through a home computer or portable computing device, such as a tablet computer or mobile phone capable of communicating with a network or over the Internet, global telecommunication network or world wide web. An EGM of the invention may include one or more processing devices in communication with a database or memory device, data input/output device and display device. The memory device may include data relating to the underlying game and embodiments of the invention as described herein, such as the selected items and skill-based target game, and the processing device may facilitate simulation of movement. The display device may display the items and simulations as described herein and the data input/output device may accept wagers and provide awards.

In one aspect of the present invention, a method of allowing a player to play a game on a gaming device is provided. The method includes allowing a player to make a wager associated with a primary wagering game, responsively displaying the primary wagering game on the display device, randomly generating an outcome of the primary wagering game, and providing a primary game award to the player as a function of the primary wagering game outcome. The method also includes displaying a secondary skill-based game on the display device including a plurality of targets and a plurality of player-selectable items for use in contacting the plurality of targets, allowing the player to select at least one item from the plurality of player-selectable items, allowing the player to select a movement associated with the selected item, determining an outcome of the secondary skill-based game as a function of the selected item and the selected item movement, and displaying the secondary skill-based game outcome including a simulated movement of the selected item in which the selected item is displayed as either contacting a target or not contacting a target.

In another aspect of the present invention, a gaming machine displaying a game is provided. The gaming machine includes a display device, a user input device for generating a signal indicative of a player's selection input, and a controller for allowing a player to make a wager associated with a primary wagering game, displaying the primary wagering game on the display device, randomly generating an outcome of the primary wagering game, and providing a primary game award to the player as a function of the primary wagering game outcome. The controller also displays a secondary skill-based game on the display device including a plurality of targets and a plurality of player-selectable items for use in contacting the plurality of targets, allows the player to select at least one item from the plurality of player-selectable items, allows the player to select a movement associated with the selected item, determines an outcome of the secondary skill-based game as a function of the selected item and the selected item movement, and displays the secondary skill-based game outcome including a simulated movement of the selected item in which the selected item is displayed as either contacting a target or not contacting a target.

In yet another aspect of the present invention, a system is provided. The system includes a plurality of gaming devices and a system controller. Each gaming device includes a user input device for accepting a player's selection input and a display device. The system controller is coupled to each gaming device for displaying a game on at least one gaming device. The system controller allows a player to make a wager associated with a primary wagering game, displays the primary wagering game on the display device, randomly generates an outcome of the primary wagering game, and provides a primary game award to the player as a function of the primary wagering game outcome. The system controller also displays a secondary skill-based game on the display device including a plurality of targets and a plurality of player-selectable items for use in contacting the plurality of targets, allows the player to select at least one item from the plurality of player-selectable items, allows the player to select a movement associated with the selected item, determines an outcome of the secondary skill-based game as a function of the selected item and the selected item movement, and displays the secondary skill-based game outcome including a simulated movement of the selected item in which the selected item is displayed as either contacting a target or not contacting a target.

In yet another aspect of the present invention, a method of allowing a player to play a game on a gaming device is provided. The method includes the steps of allowing a player to make a wager associated with a skill-based game and responsively displaying the skill-based game on the display device including a plurality of targets and a plurality of player-selectable items for use in contacting the plurality of targets. The method also includes allowing the player to purchase at least one item from the plurality of player-selectable items using the wager, allowing the player to select a movement associated with the selected item, determining an outcome of the skill-based game as a function of the purchased item and the selected item movement, displaying the skill-based game outcome including a simulated movement of the selected item in which the selected item is displayed as either contacting a target or not contacting a target, and providing an award to the player as a function of the skill-based game outcome.

BRIEF DESCRIPTION OF THE DRAWINGS

Other advantages of the present invention will be readily appreciated as the same becomes better understood by reference to the following detailed description when considered in connection with the accompanying drawings wherein.

Corresponding reference characters indicate corresponding parts throughout the drawings.

DETAILED DESCRIPTION OF THE PREFERRED EMBODIMENT

Figure 1:
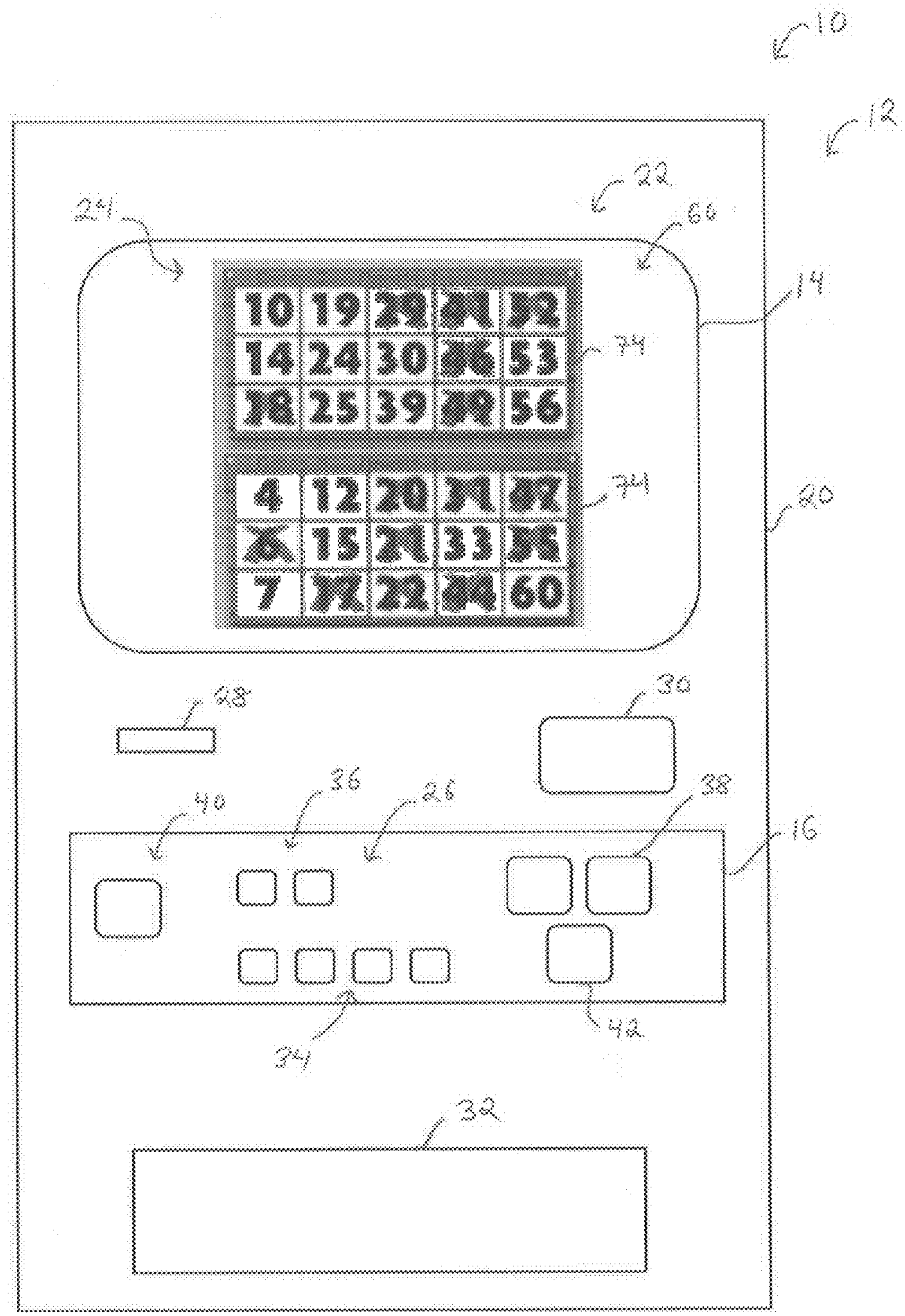
FIG. 1 is a schematic view of an exemplary gaming machine of the present invention.

With reference to the drawings and in operation, the invention overcomes at least some of the disadvantages of known gaming machines by providing, among other things, systems and methods which enable a player to place a wager on a skill-based game and receive an award that may be used to place a wager on another non-skill based game. For example, the system and methods of the invention are configured to allow the player to play a bingo-type wagering game that includes a bonus feature skill-based game and that allows the player to receive an enhanced award based on the outcome of the skill-based game. More specifically, the system and methods of the present invention allow the player to place a wager on the outcome of the skill-based game and interact with the skill-based game to affect the game outcome, and provide an award to the player based on the outcome of the skill-based game and the player's wager. In addition, the player may place a wager on the bingo-type game using the award provided in the skill-based game. By providing a bingo-type game that includes a bonus feature skill-based game that provides an award to the player that may be used for wagering on the bingo-type game, the player's expectation for achieving a win is increased and the enjoyment of the game is improved. Thus, the amount of time that the game is played by patrons of a gaming establishment is thereby increased.

The invention is generally directed to systems and methods to promote and enhance game play by allowing a player to place a wager on a primary game such as, for example, a bingo-type game, receive an award based on the outcome of the primary game, and allow a player to play a secondary skill-based game and to receive an award based on the outcome of the secondary skill-based game that may be used to wager on the primary game.

In some embodiments, the present invention includes system 10 that displays a bingo-type game, allows a player to make a wager associated with the bingo-type game, randomly generates an outcome of the bingo-type game and provides a primary game award to the player as a function of the bingo-type game outcome. The system 10 may also display a secondary skill-based game that includes a plurality of targets and a plurality of player-selectable items that are used to contact one or more targets. The system 10 allows the player to select an item and to select a movement associated with the item, and determines an outcome of the secondary skill-based game based on the player selected item and movement. The system 10 then displays the secondary skill-based game outcome including a simulated movement of the selected item in which the selected item is displayed as either contacting a target or not contacting a target. In one embodiment, the system 10 provides a secondary award of wagering credits to the player based on the secondary skill-based game outcome and allows the player to place a wager on the bingo-type game using the secondary award wagering credits.

In some embodiments, the skill-based game may include any game that allows the player to affect the outcome of the skill-based game through a series of player choices and/or player selections. The skill-based game may also include a player skill component associated with the player's selection that may include physical or manual dexterity, digital dexterity, hand-eye coordination (e.g., aim), reflexes, memory, cognitive processing, knowledge, and/or strategy-based selection. Skill-based games may include, but are not limited to including, target shooting games, catapult-type games, sporting games, memory games, matching games, and/or any suitable game that includes a skill component and that enables the outcome of the game to be at least partially determined based on a players selection.

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 2:
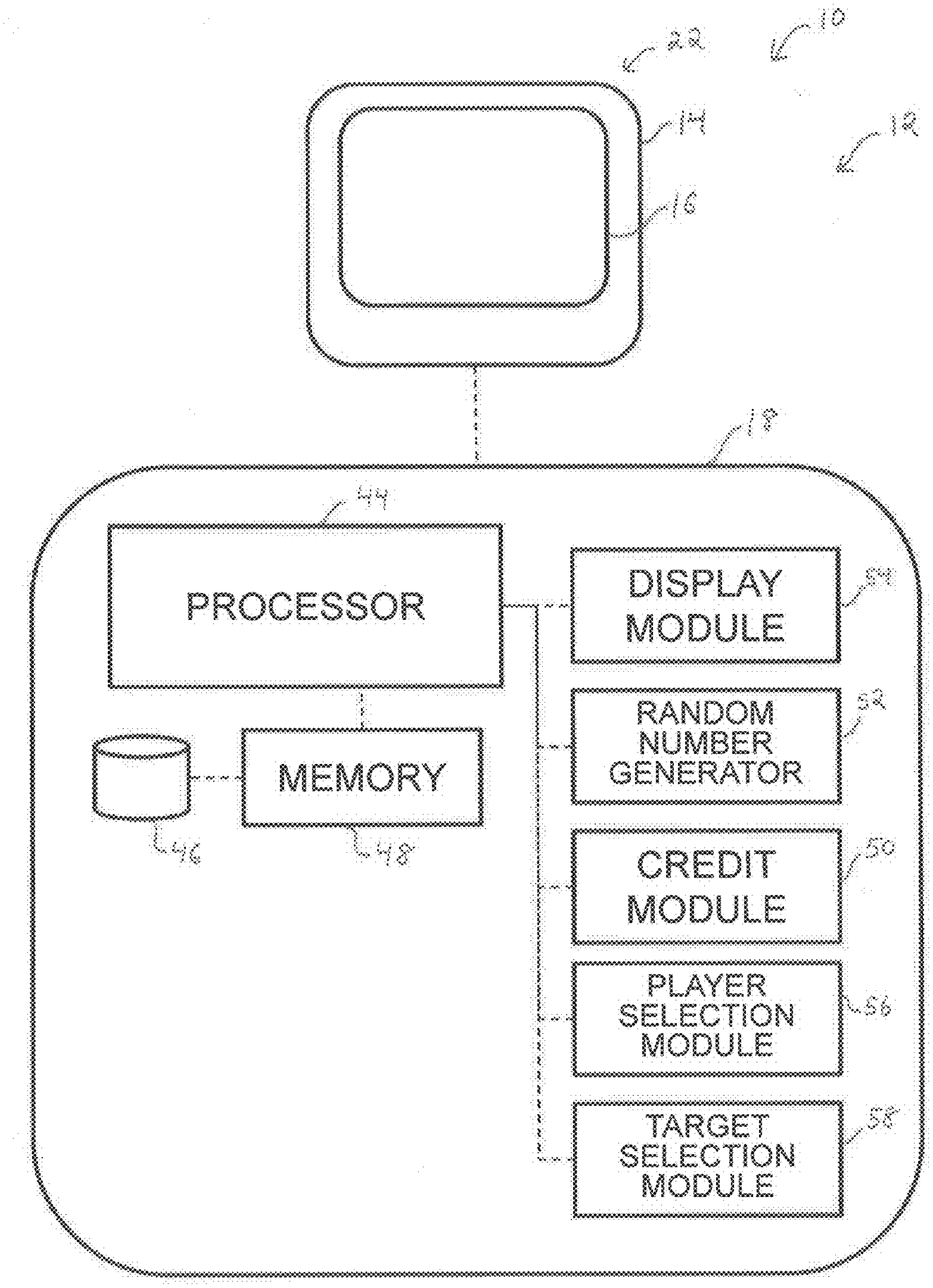
FIG. 2 is another schematic representation of the gaming machine shown in FIG. 1.

FIG. 1 is a perspective view of a gaming machine 12 that may be used with the system 10, according to an embodiment of the present invention. FIG. 2 is a schematic representation of the gaming machine 12. A preferred embodiment of the present invention is a video gaming machine preferably installed in a casino. In the illustrated embodiment, the gaming machine 12 includes the display device 14 for displaying a plurality of games, a user input device 16 to enable a player to interface with the gaming machine 12, and a gaming controller 18 that is operatively coupled to the display device 14 and the user input device 16 to enable a player to play games displayed on the display device 14. The gaming machine 12 may also includes a cabinet assembly 20 that is configured to support the display device 14, the user input device 16, and/or the gaming controller 18 from a supporting surface.

The display device 14 and the user input device 16 are coupled to the cabinet assembly 20 and are accessible by the player. In one embodiment, the gaming controller 18 is positioned within the cabinet assembly 20. Alternatively, the gaming controller 18 may be separated from the cabinet assembly 20, and connected to components of the gaming machine 12 through a network such as, for example, a local area network (LAN), a wide area network (WAN), dial-in-connections, cable modems, wireless modems, and/or special high-speed Integrated Services Digital Network (ISDN) lines.

In the illustrated embodiment, the display device 14 includes a display 22 including a flat panel display, such as a cathode ray tube display (CRT), a liquid crystal display (LCD), a light-emitting diode display (LED), an organic light-emitting diode (OLED), an active-matrix organic light-emitting diode (AMOLED), a plasma display, and/or any suitable visual output device capable of displaying graphical data and/or text to a user. Alternatively, a single component, such as a touch screen, may function as both the display device 14 and as the user input device 16. In the illustrated embodiment, the display device 14 displays a game screen 24 (shown in FIGS. 4 and 5) including indicia and/or symbols for use in a game, e.g., symbols for a bingo game, cards used by a card game, roulette wheel and symbols used in a roulette game, reels used in a reel game, and items and target used in the target game. The game screen 24 may include any type of game including, but not limited to, a skill-based game such as a target game, a video bingo game, video keno game, a video slot game, a blackjack game, a video poker game, or any type of game which allows a player to make a wager, play a game, and potentially provide the player an award based on an outcome of the game. In addition, the display device 14 may display game play instructions for performing the game including, but not limited to, playing instructions, paytables, paylines, betting lines and/or any other information to enable the gaming machine 12 to function as described herein. Moreover, in one embodiment, the display device 14 may include a plurality of displays 22 that each are be configured to display at least a portion of the game screen 24 and/or game play instructions.

The user input device 16 includes a plurality of input buttons 26, a coin slot 28, a bill acceptor 30, and a coin tray 32 for dispensing coins to the player. In one embodiment, the input buttons 26 may include a plurality of BET switches 34 for inputting a wager on a game and selecting a number of rounds to be played during a gaming session, a plurality of selection switches 36 for allowing a player to select a plurality of game symbols, a CLEAR switch 38 for de-selecting player selected game symbols, a PAYOUT switch 40 for ending a gaming session and dispensing accumulated gaming credits to the player, and a start button, i.e., a DRAW switch 42 to initiate an output of a game. In addition, the user input device 16 may includes, for example, a keyboard, a pointing device, a mouse, a stylus, a touch sensitive panel (e.g., a touch pad or a touch screen), a gyroscope, an accelerometer, a position detector, an audio input device, and/or any suitable input device that enables the player to interact with the gaming machine 12 to play a skill-based game.

The coin slot 28 includes an opening that is configured to receive coins and/or tokens deposited by the player into the gaming machine 12. The gaming machine 12 converts a value of the coins and/or tokens to a corresponding amount of gaming credits that are used by the player to wager on games played on the gaming machine 12. The bill acceptor 30 includes an input and output device that is configured to accept a bill, a ticket, and/or a cash card into the gaming machine 12 to enable an amount of gaming credits associated with a monetary value of the bills, ticket, and/or cash card to be credited to the gaming machine 12.

Referring to FIG. 2, in the illustrated embodiment, the gaming controller 18 includes a processor 44, a database 46, a memory device 48 coupled to the processor 44 and the database 46, a credit module 50, a random-number generator 52, a display module 54, a player selection module 56, and a target selection module 58. The memory device 48 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the processor 44 to store, retrieve, and/or execute instructions and/or data.

The processor 44 executes various programs, and thereby controls other components of the gaming controller 18 according to player instructions and data accepted by the user input device 16. The processor 44 in particular executes a game program, and thereby conducts a game in accordance with the embodiments described herein. The memory device 48 stores programs and databases used by the processor 44. Moreover, the memory device 48 stores and retrieves information in the database 46 including, but not limited to, a game type, a number of game symbols associated with a game, a number of player selectable game symbols, a plurality of simulated movements associated with each game symbol, image data for producing game images and/or screens on the display device 14, and temporarily stores variables, parameters, and the like that are used by the processor 44. In addition, the memory device 48 stores indicia, symbol weights, paytables, and/or winning combination tables which represent relationships between combinations of random numbers, combinations of symbol matches and types of awards. In one embodiment, the memory device 48 utilizes RAM to temporarily store programs and data necessary for the progress of the game, and EPROM to store, in advance, programs and data for controlling basic operation of the gaming machine 12, such as the booting operation thereof.

The credit module 50 manages the amount of player's credits, which is equivalent to the amount of coins and bills counted and validated by the bill acceptor 30. The credit module 50 converts a player's credits to coins, bills, or other monetary data by using the coin tray and/or for use in dispensing a credit voucher via the bill acceptor 30.

The display module 54 controls the display device 14 to display various images on screens preferably by using computer graphics and image data stored in the memory device 48. More specifically, the display module 54 controls the game symbols displayed in a primary game such as, for example, a bingo-type game 60 (shown in FIG. 4) and in secondary game such as, for example, a skill-based game 62 (shown in FIG. 5) displayed on the display device 14 by using computer graphics and the image data. In the illustrated embodiment, the skill-based game 62 includes a plurality of targets 64 being displayed within a playing field 66 and a launching device 68 for launching a player selectable item 70 towards the targets 64.

The random-number generator (RNG) 52 generates and outputs random numbers to the processor 44 preferably at the start of each round of game. In addition, the processor 44 may use random numbers generated by the RNG 52 to determine if a triggering condition has occurred in the outcome of the game, and to determine whether or not to provide an award to a player. For example, if the game is a bingo-type game, the processor 44 uses the RNG 52 to randomly select one or more bingo cards for use during the bingo-type game and to randomly select a plurality of game symbols during a symbol draw. The processor 44 compares the game symbols selected during the draw with the symbols and/or numbers displayed in the selected bingo cards to determine a number of bingo cards symbols matching the randomly selected game symbols. The processor 44 also compares the determined symbol matches with winning combinations stored in the winning combination table to determine if the symbol matches include a winning outcome that is associated with a type of award. In addition, the processor 44 may determine if a triggering condition occurred in the bingo-type game and provides an additional award such as, for example, a bonus feature game and/or an enhanced award based on the triggering condition.

The player selection module 56 includes a list including a plurality of player selectable items 70 that may be used in the skill-based game 62 and a plurality of predefined simulated movements that may be used with each of the player selectable items 70. The player selection module 56 receives a player selection input from the input device 16 and selects items 70 based on the player's selection. In addition, the player selection module 56 receives a player selection input associated with a movement of a selected item 70 and generates a simulated item movement such as, for example, and item trajectory, represented by phantom line 72, based on the player selection input. In one embodiment, the player selection module 56 includes a plurality of predefined simulated movements 72 associated with each item 70. The player selection module 56 may select a predefined simulated movement 72 associated with an item 70 based on the received player selection input and display the item 70 with the simulated movement 72.

For example, during play of a skill-based game 62, the gaming controller 18 may display a plurality of player selectable items 70 on the display device and allow the player to select one or more items 70 for use in the skill-based game 62. The gaming controller 18 displays the skill-based game 62 with the selected item 70 and allows the player to select a movement to be associated with item 70 during the skill-based game 62. The player selection module 56 receives a player selection input indicative of the player's selected movement and determines a predefined simulated movement 72 to be associated with item 70 based on the player selection input. The processor 44 determines an outcome of the skill-based game 62 based on the selected predefined simulated movement 72, and displays the skill-based game 62 including the item 70 being displayed with the selected predefined simulated movement 72. In one embodiment, the processor 44 may use the RNG 52 to randomly select one or more predefined simulated movements 72 to be displayed with the selected item 70. In addition, the processor 44 may use the RNG 52 to randomly select an item 70 for use in the skill-based game 62.

The target selection module 58 includes list including a plurality of targets 64 that are associate with each predefined simulated movement 72. In addition, the target selection module 58 also includes a plurality of paytables including a listing of awards associated with each target 64. The paytables may also include a listing of awards based on an amount of the wager received with the primary game 60, a wager received with the skill-based game 62, and/or an amount of items purchased during the skill-based game. In the illustrated embodiment, the target selection module 58 is configured to receive a predefined simulated movement 72 associated with a selected item 70 and determine whether a target 64 is contacted by the selected item 70 based on the predefined simulated movement 72. In addition, the target selection module 58 determines an award associated with a contacted target 64 based in the selected predefined simulated movement 72. For example, in one embodiment, during play of the skill-based game 62, the gaming controller 18 displays each target 64 a distance from the selected item 70. The target selection module 58 receives the selected predefined simulated movement 72 associated with the item 70 and selects a target 64 to be contacted by the item 70 based on the selected predefined simulated movement 72. The gaming controller 18 then displays the item 70 contacting the selected target 64 with the selected simulated movement 72, and provides an award to the player determined as a function of the selected target 64.

Figure 3:
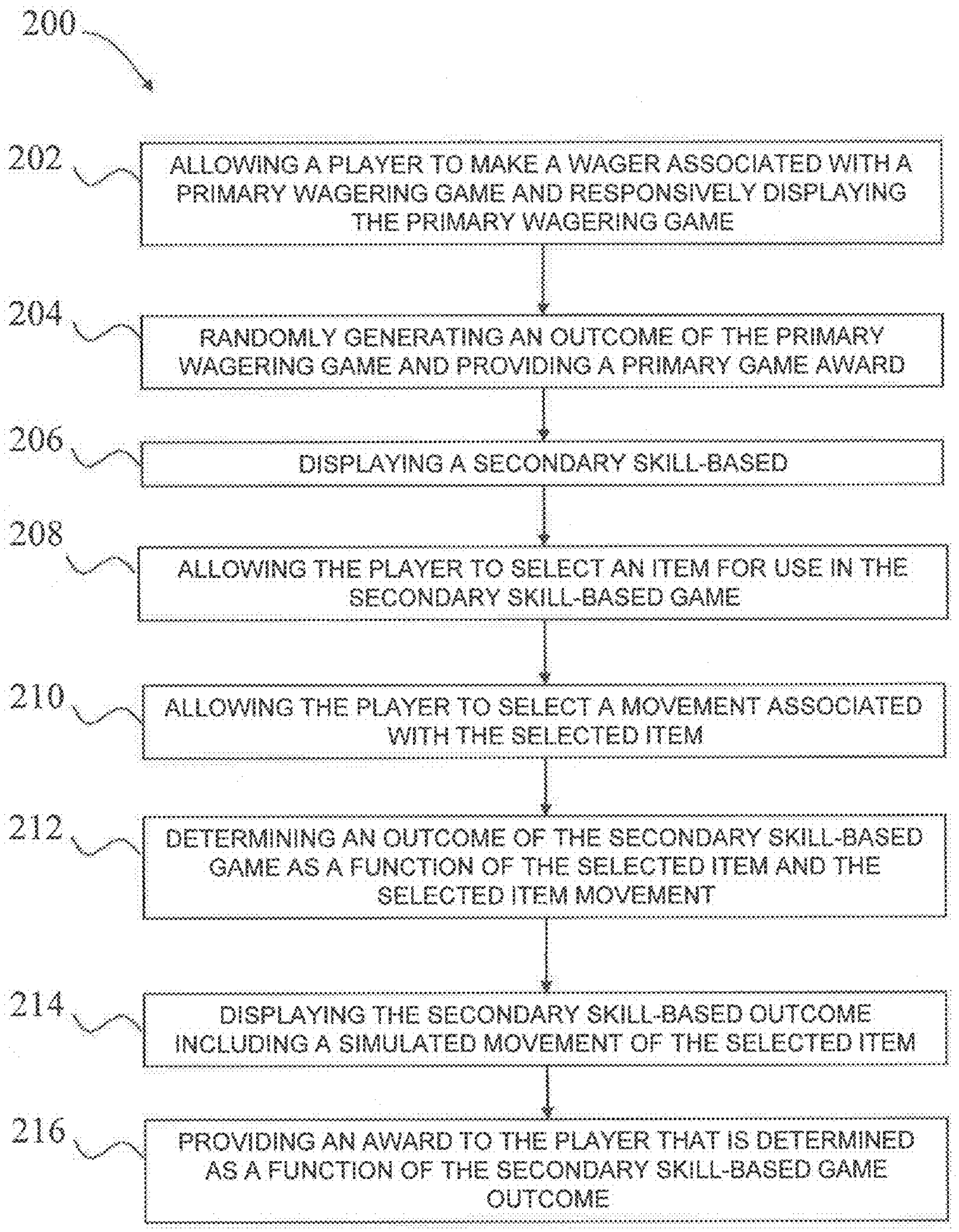
FIG. 3 is a flowchart of a method that may be used with the gaming machine shown in FIG. 1 for allowing a player to play a wagering game and a skill-based game on the gaming machine, according to an embodiment of the present invention.
Figure 4:
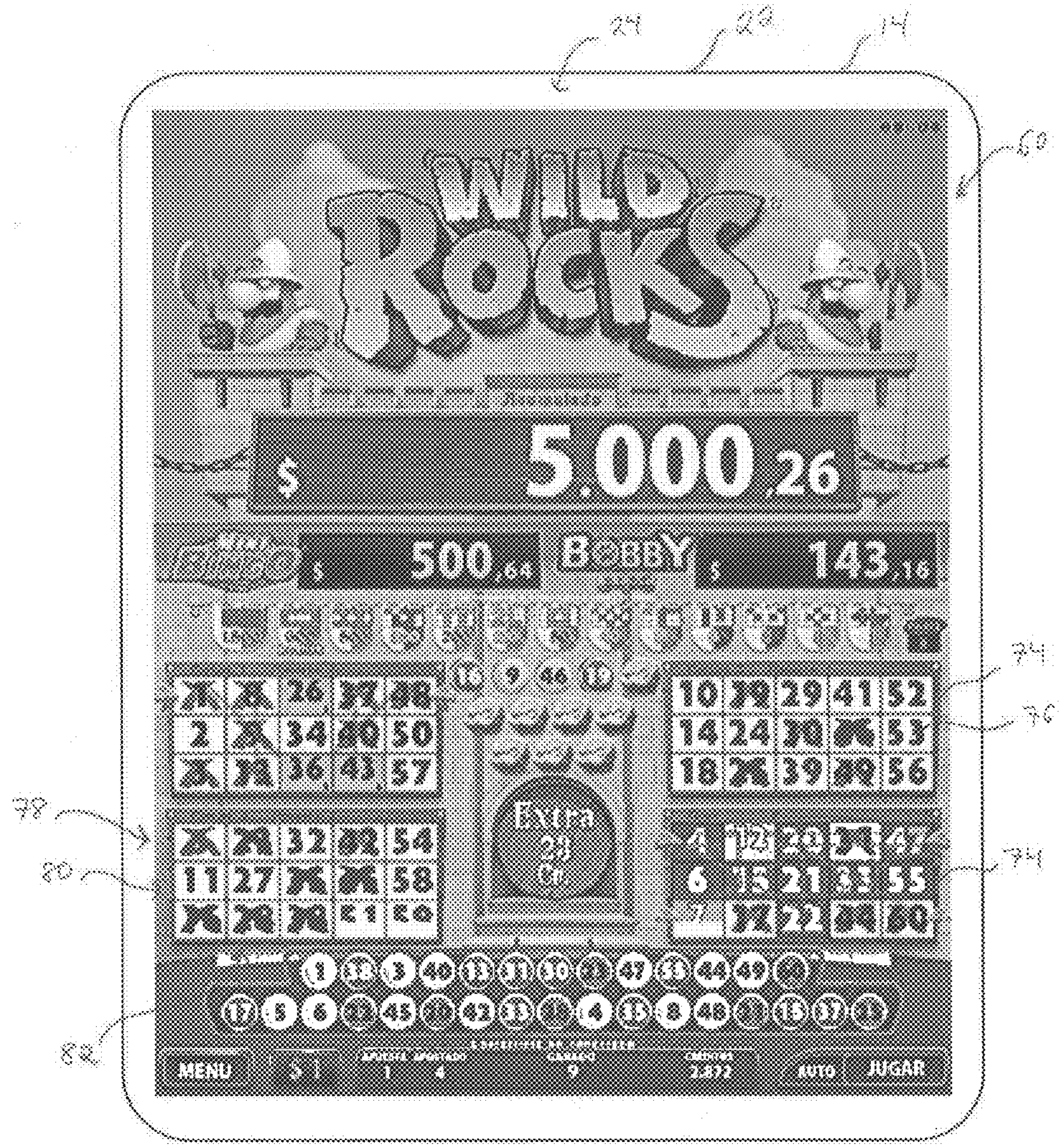
FIG. 4 is an exemplary entertaining graphical display of a bingo-type game that may be played with the gaming machine shown in FIG. 1, according to an embodiment of the present invention.
Figure 5:
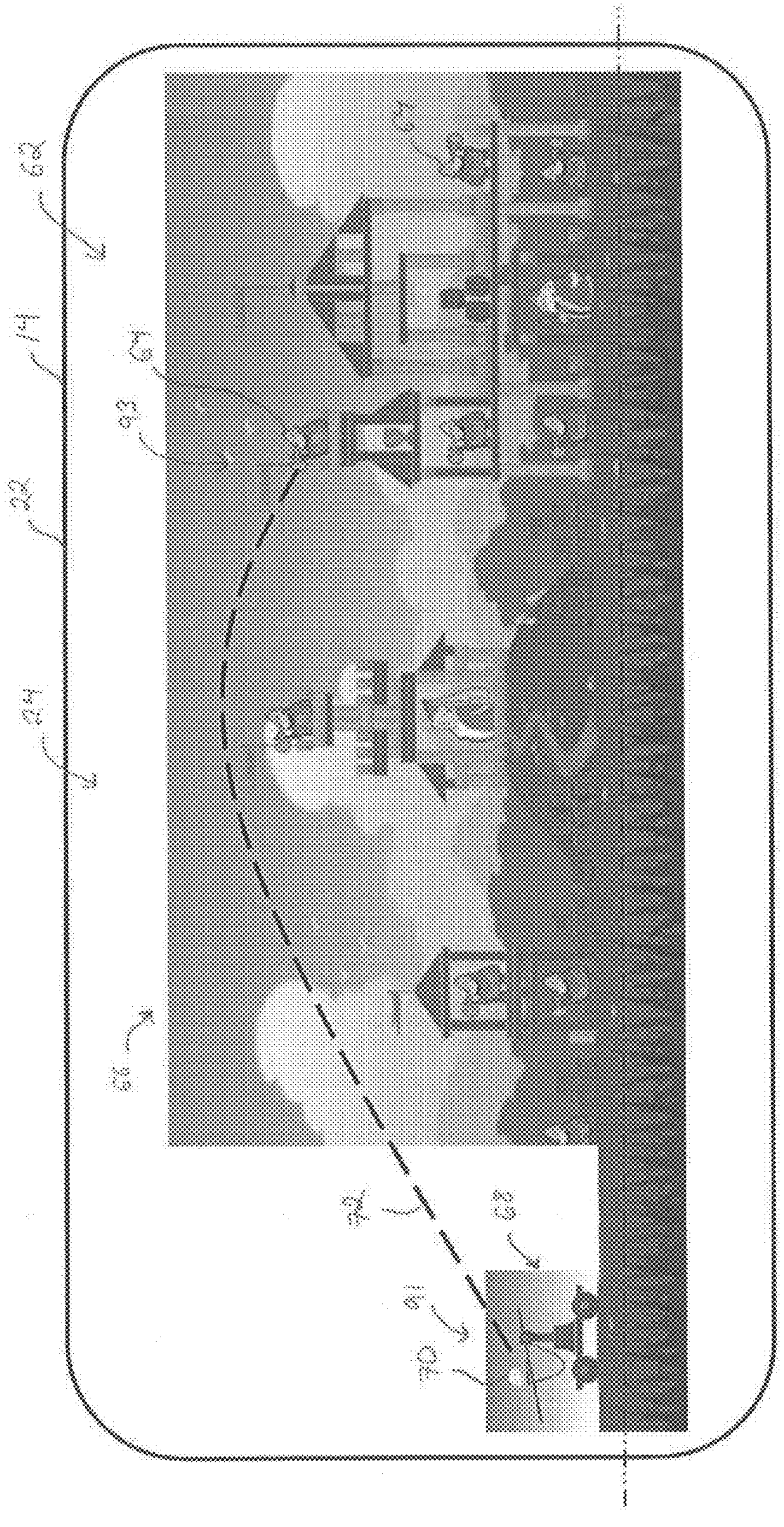
FIG. 5 is an exemplary entertaining graphical display of a skill-based game that may be played with the gaming machine shown in FIG. 1, according to an embodiment of the present invention.

FIG. 3 is a flowchart of a method 200 that may be used with the system 10 for allowing a player to play a wagering game and a skill-based game on the gaming machine 12. The method 200 includes a plurality of steps. Each method step may be performed independently of, or in combination with, other method steps. Portions of the method 200 may be performed by any one of, or any combination of, the components of the system 10. FIG. 4 is an exemplary entertaining graphical display of the bingo-type wagering game 60 that may be played with the system 10. FIG. 5 is an exemplary entertaining graphical display of the skill-based game 62 that may be played with the system 10. FIGS. 6-11 are entertaining graphical displays that may be used with the method 200.

In the illustrated embodiment, in method step 202, the gaming controller 18 allows a player to make a wager associated with a primary wagering game 60 and responsively displays the primary wagering game 60 on the display device 14. In step 204, the gaming controller 18 randomly generates an outcome of the primary wagering game 60 and provides a primary game award to the player as a function of the primary wagering game outcome. In one embodiment, the primary wagering game 60 is the video bingo-type game 60. However, it should be noted that the wagering game 60 may be any type of game upon which a player could make a wager including, but not limited to a slot game, a blackjack game, a video poker game, or any type of game that enables the gaming machine 12 to function as described herein.

In general, during play of the primary wagering game 60, the gaming controller 18 displays the game including one or more bingo cards 74. Each bingo card 74 includes a plurality game symbols 76 selected from a predefined set of game symbols 76. In one embodiment, the plurality of game symbols 76 may include numbers. Alternatively, the plurality of game symbols 76 may include any symbol that may be selected from a predefined set of associated symbols.

In the illustrated embodiment, each bingo card 74 includes a plurality of game symbols 76 displayed in a grid 78 and arranged along a plurality of rows 80 and a plurality of columns 82. In the illustrated embodiment, the gaming controller 18 displays the game 60 including a plurality of bingo cards 74 determined as a function of the player's wager. More specifically, the gaming controller 18 receives a wager from the player and receives a player selection input indicative of a number of bingo cards to be purchased with the wager for use in the bingo-type game 60, and displays the selected number of bingo cards 74. In the illustrated embodiment, each bingo card 74 displays a total of 15 game symbols 76 displayed within the grid 78 arranged in 3 rows 80 and 5 columns 82 in a "3×5" arrangement. Alternatively, any number of symbols 76 may be displayed in any suitable grid arrangement including, for example, 20 game symbols 76 displayed in a 4×5 arrangement, 25 game symbols 76 displayed in a 5×5 arrangement, and/or any suitable number of game symbols 76 displayed in any suitable row 80 and column 82 combination to enable the gaming controller 18 to function as described herein. In addition, the grid 78 may be displayed with a plurality of shapes such as, for example, a rectangle, a square, a diamond, a circle, and/or any suitable shape that enables the gaming controller 18 to function as described herein.

Each bingo game is generally played in a conventional manner. The player makes a wager, which may be based on a predetermined denomination and a selected number of bingo cards 74 to be selected by the player and/or a selected number of game symbols 76, and initiates a symbol draw operation. During the symbol draw operation, the gaming controller 18 randomly selects a plurality of game symbols 76 from the predefined set of game symbols 76 and sequentially displays each selected game symbol 76 on the display device 14. In one embodiment, the gaming controller 18 may compare the game symbols 76 displayed on each selected bingo card 74 with each drawn game symbol 76, and identify (shown as an "X" in FIG. 4) each bingo card symbol 76 that matches the drawn game symbol 76. In another embodiment, the player may identify the matched bingo card symbol 76.

The gaming controller 18 determines an outcome of the game 60 based on the matched symbols 76 and provides an award to the player based on the matched symbols, the wager, and a predetermined paytable. For example, the gaming controller 18 may provide an award to the player based on a predefined pattern formed by the matched symbols 76 on a bingo card 74 and/or a predefined number of matched symbols 76 on one or more bingo cards 74. Moreover, the gaming controller 18 may also determine a type of game symbol that is matched and provide an award if the matched symbol types are associated with a predefined symbol type. In general, the term "award" may be a payout, in terms of credits or money. Thus, the gaming controller 18 may award a regular payout in response to the outcome of the wagering game 60. However, it should be noted that the term award may also refer to other types of awards, including, prizes, e.g., meals, show tickets, etc. . . . , as well as in-game award, such as free games, bonus symbols, and/or special game modes. Many variations to the above described general play of a bingo-type game fall within the scope of the present invention. Such bingo games are well-known in the art, and are therefore not further discussed.

In method step 206, the gaming controller 18 displays a secondary skill-based game 62 on the display device 14. In one embodiment, the gaming controller 18 determines if a triggering condition occurs in the primary game outcome and responsively displays the secondary skill-based game 62 based on the occurrence of the triggering condition. For example, in one embodiment, the gaming controller 18 may determine an amount of wagering credits accumulated by the player during a gaming session and/or during play of the primary game 60, and determine the triggering condition to occur if the amount of wagering credits is greater than, or equal to, a predefined amount of wagering credits. In another embodiment, the gaming controller 18 may define the triggering condition as a predefined amount of wagering credits placed as a wager during the primary game 60. In another embodiment, the gaming controller 18 may define the triggering condition as an appearance of a special symbol in the primary game outcome.

In the illustrated embodiment, the secondary skill-based game 62 is a target based game and includes a plurality of targets 64 and a plurality of player-selectable items 70 for use in contacting (such as impacting, knocking down, and/or destroying) the plurality of targets 64. Alternatively, the secondary skill-based game 62 may include a game that includes a player skill component associated with a player's input and that determines an outcome of the game based at least in part on the player skill component.

In the illustrated embodiment, the gaming controller 18 is configured to display the secondary skill-based game 62 including a plurality of targets 64 displayed within a playing field 66. The gaming controller 18 also displays a launching device 68 that may be used by the player to launch an item 70 from the launching device 68 towards the targets 64. Each target 64 is spaced a distance form the launching device 68 to allow the player to cause the item 70 to be moved from the launching device 68 towards the targets 64 along a item trajectory 72.

Figure 6:
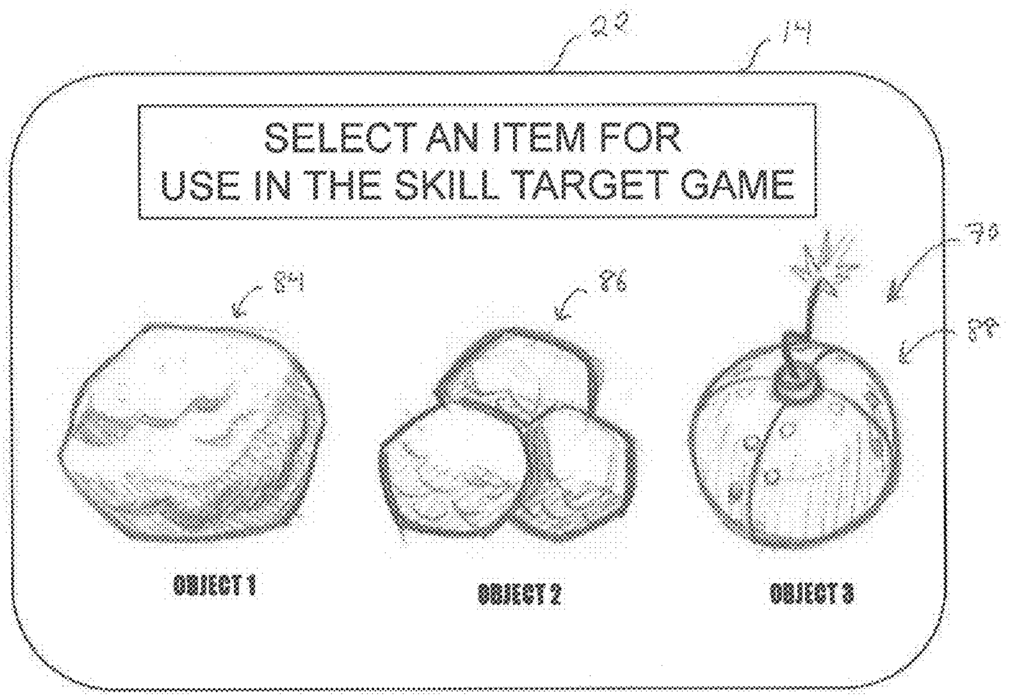
FIG. 6 is an exemplary entertaining graphical display of an item selection screen, according to an embodiment of the present invention.
Figure 7:
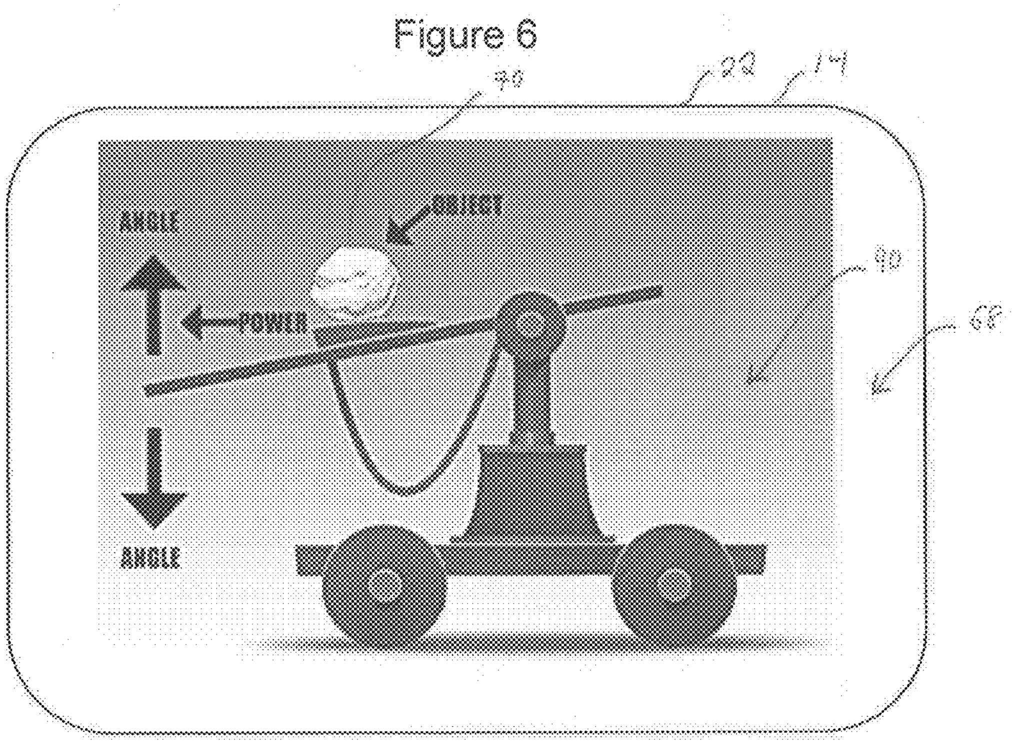
FIG. 7 is an exemplary entertaining graphical display of an item launching device that may be used with the skill-based game shown in FIG. 5.
Figure 8:
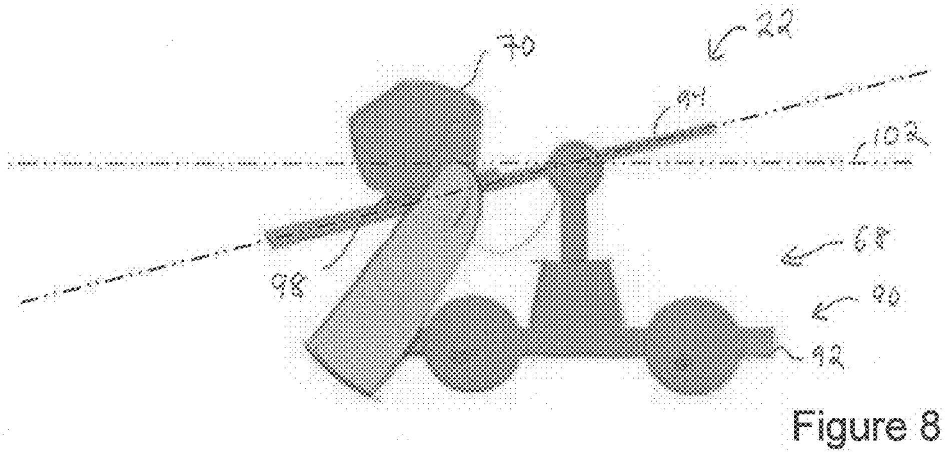
FIGS. 8-10 are schematic views of the item launching device shown in FIG. 7.
Figure 9:
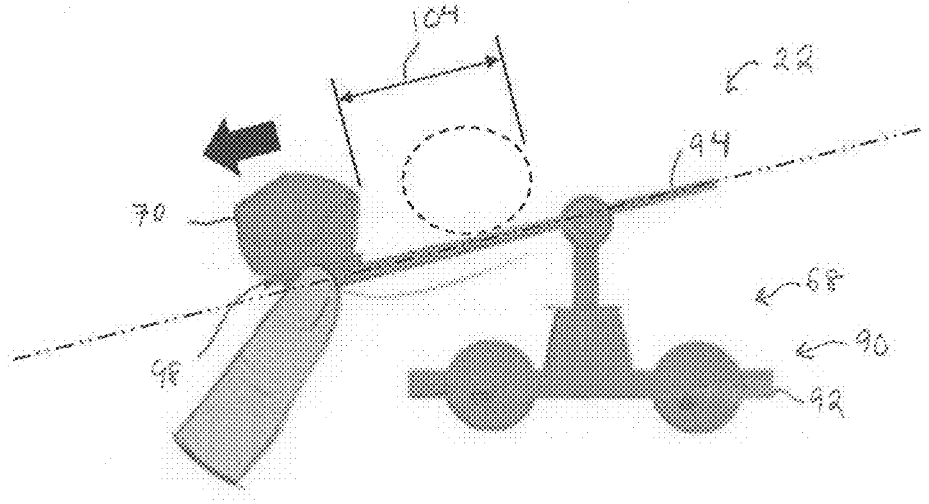
Figure 10:
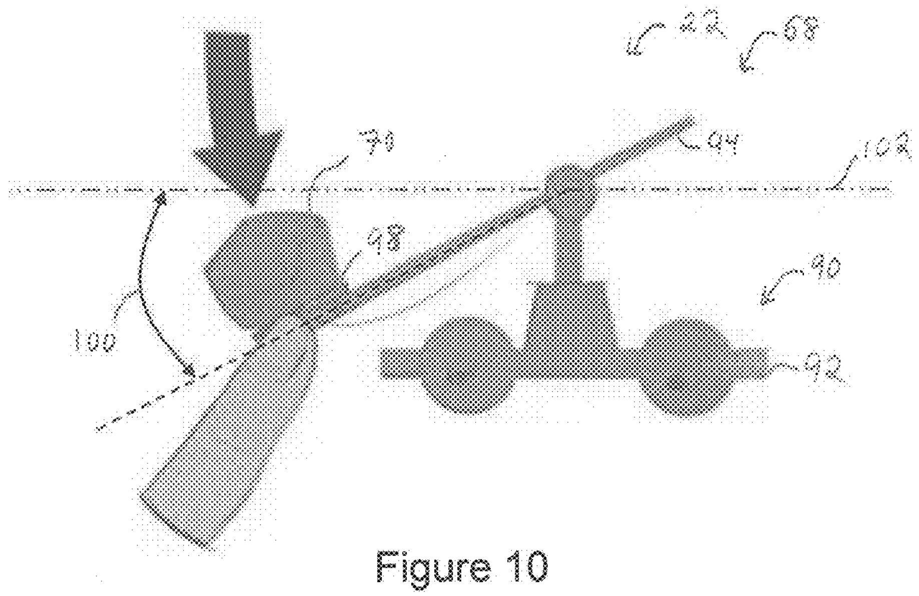

In step 208, the gaming controller 18 allows the player to select at least one item 70 from the plurality of player-selectable items 70 for use in the secondary skill-based game 62. For example, as shown in FIG. 6, the gaming controller 18 may display a plurality of player selectable items 70 and allow the player to select one or more player selectable items 70. The gaming controller 18 receives a player selection input indicative of a selected item 70 and displays the selected item 70 in the secondary skill-based game 62 for use by the player. In the illustrated embodiment, each item 70 includes a corresponding simulated movement. The simulated movement may be, for example, a trajectory 72, multiple trajectories, a change in shape, a change in direction, and/or any visual characteristic that may be associated with the item 70. For example, as shown in FIG. 6, 3 items 70 may be displayed for selection by the player, including a large boulder 84, small boulders 86, and a bomb 88, each having a different trajectory 72 when launched from the launching device 68. The bomb 88 may include an additional "exploding" characteristic when contacting a target. The small boulders 86 may also separate during flight such that multiple trajectories occur when the small boulders 86 are launched, wherein each small boulder has a different trajectory. Many variations to the above described simulated movements fall within the scope of the present invention.

In step 210, the gaming controller 18 allows the player to select a movement associated with the selected item 70. As shown in FIGS. 7-10, the gaming controller 18 is configured to display the launching device 68 to allow a player to manipulate the launching device 68 via player selection inputs (represented as a "finger" being swiped across the user input device 14) that correspond to the player skill component of the secondary skill-based game 62. In the illustrated embodiment, the launching device 68 includes a catapult 90 that launches the selected item 70 along the determined item trajectory 72 from a starting position 91 to an ending position 93. The catapult 90 is displayed including a base 92, a throwing arm 94 attached to the base 92, and a projectile support 98 for supporting the item 70 from the throwing arm 94.

In the illustrated embodiment, each player selectable item 70 is associated with a plurality of predefined trajectories 72. The player uses a skill component in selecting a trajectory 72 to be associated with the item 70 to contact the targets 64 displayed in the playing field 66. The gaming controller 18 allows the player to select a characteristic of the catapult 90 and selects a predefined trajectory 72 based on the selected catapult characteristic. In one embodiment, the catapult characteristics may include an angle of incline 100 of the throwing arm 94 and a power of the catapult 90. For example, in one embodiment, during play of the game 62, the player may adjust an angle of incline 100 of the catapult 90 by adjusting the angle of the throwing arm 94 with respect to a horizontal axis 102. In addition, the player may adjust a launch power associated with item 70 by moving the item 70 a distance 104 along the throwing arm 94. As the player adjust the angle of incline 100 and the catapult power, the gaming controller 18 determines the trajectory 72 associated with the angle 100 and power to be used when the player releases the item 70. More specifically, the player selection module 56 receives player selection input indicative of the selected item 70, the selected incline angle 100, and the selected launch power, and determines a predefined trajectory 72 to be displayed with the item 70. Once the player has adjusted the angle of incline 100 and the launch power, the player releases the item causing the catapult 90 to hurl the item towards the targets 64 along the selected trajectory 72.

In step 212, the gaming controller 18 determines an outcome of the secondary skill-based game 62 as a function of the selected item 70 and the selected item movement 72. In step 214, the gaming controller 18 displays the secondary skill-based outcome including a simulated movement of the selected item 70 in which the selected item 70 is displayed as either contacting a target 64 or not contacting a target 64. In the illustrated embodiment, the target selection module 58 selects a target 64 to be contacted by the item 70 based on the determined item trajectory 72. More specifically, the target selection module 58 receives information indicative of the determined item trajectory 72 from the player selection module 56 and determines whether a displayed target 64 is contacted by the item 70 based on the determined trajectory 72.

In step 216, the gaming controller 18 provides an award to the player that is determined as a function of the secondary skill-based game outcome. More specifically, the gaming controller 18 determines whether to provide an award to the player based on the player selection input associated with the skill-based component. For example, the gaming controller 18 may provide an award to the player if the player selects an item trajectory 72 that causes the item to contact one or more targets 64.

In one embodiment, the gaming machine 12 may provide an award based on the outcome of the skill-based game 62 that includes wagering credits that may be used to place a wager in the primary wagering game 60. For example, the target selection module 58 may include a paytable including a plurality of awards associated with a plurality of predefined item trajectories 72. The gaming controller 18 may determine the predefined item trajectory 72 based on player selection input and provide an award based on the selected item trajectory 72 and the award paytable.

In addition, the gaming controller 18 may display each target 64 with an associated wagering credit value, determine the award based on the player selection input, and display the skill-based game outcome including displaying the selected item 70 contacting a target 64 having a credit value corresponding to the determined award. For example, the gaming controller 18 may display the item 70 contacting one target 64 having a wagering credit value equal to the determined award value. In addition, the gaming controller 18 may display the item 70 contacting a plurality of target 64 each having a wagering credit value the sum of which is equal to the determined game award.

Figure 11:
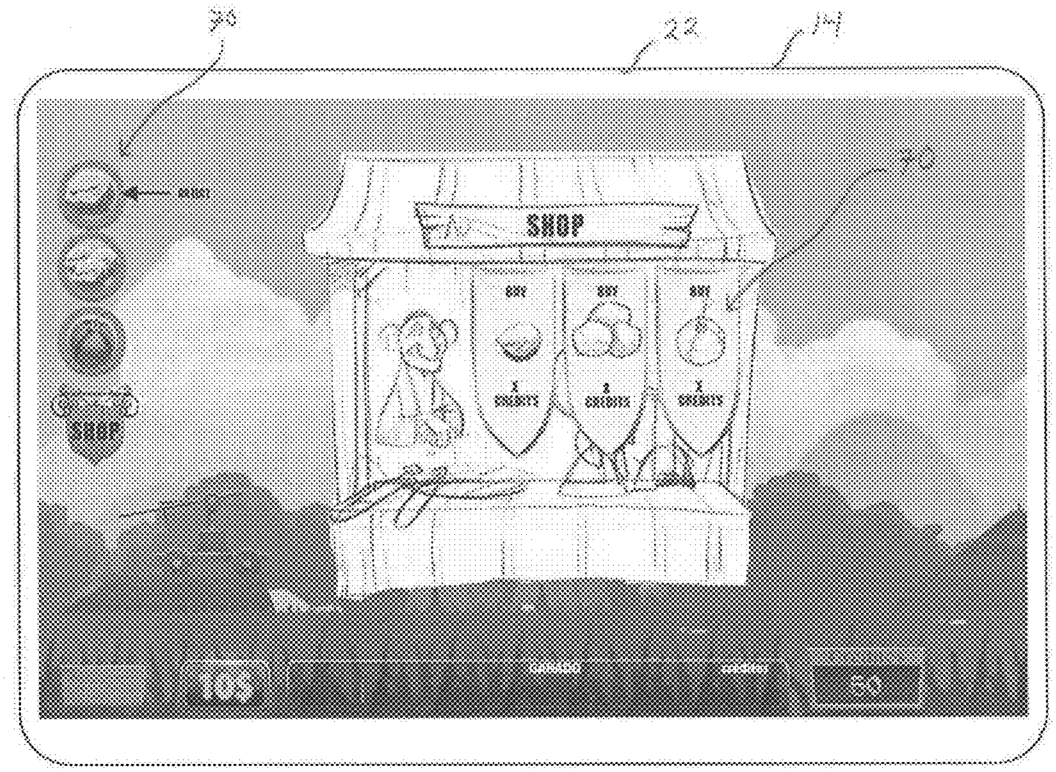
FIG. 11 is an exemplary entertaining graphical display of an item purchase screen, according to an embodiment of the present invention.
Figure 12:
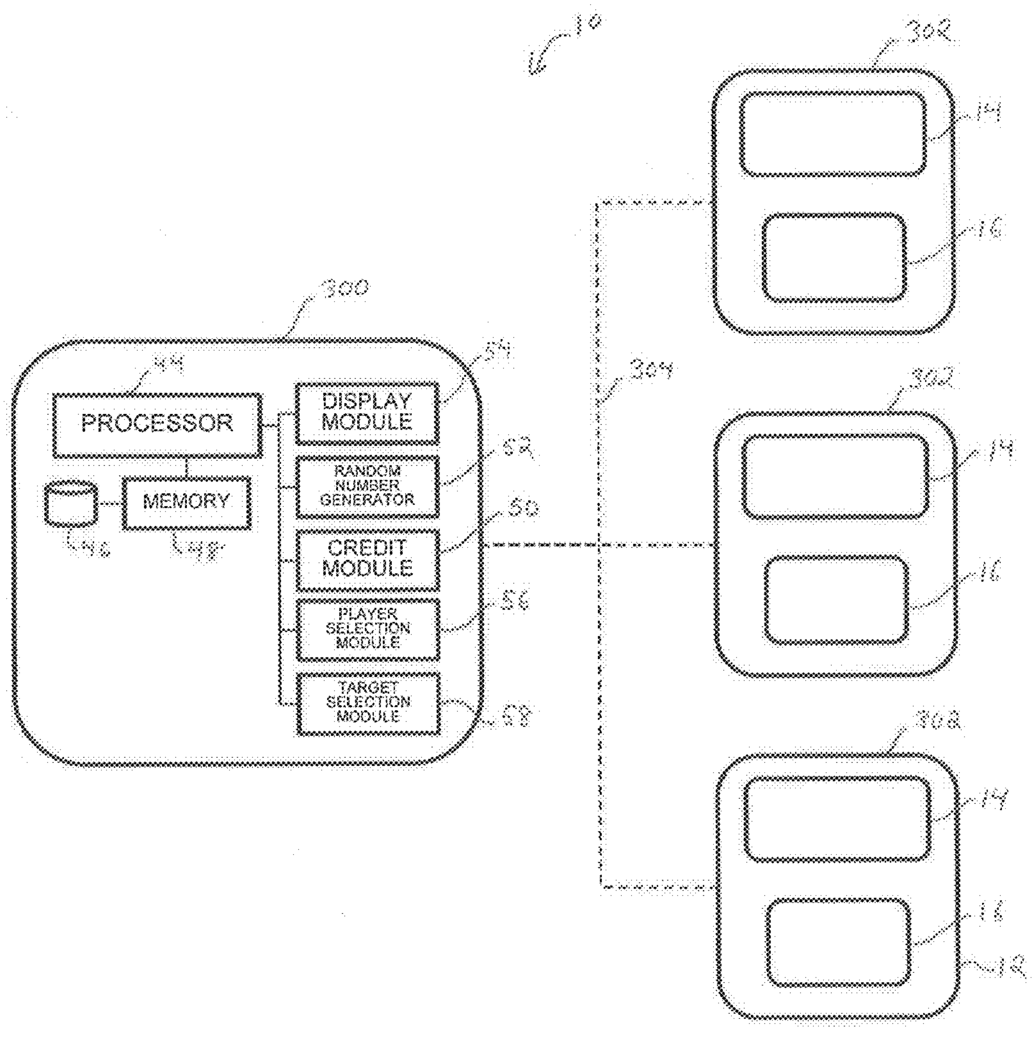
FIG. 12 is a schematic view of an exemplary system of the present invention.

In the illustrated embodiment, the gaming controller 18 is configured to allow the player to purchase an item 70 from a plurality of player selectable items 70 and display the secondary skill-based game with the purchased item 70. For example, as shown in FIG. 11, the gaming controller 18 may display a plurality of items 70 that may be purchased by the player using wagering credits received during play of the primary game 60. The gaming controller 18 may allow the player to purchase each item 70 using gaming credits awarded during the primary game 60 and/or gaming credits stored in the credit module 50. Moreover, the gaming controller 18 may allow the player to use wager credits awarded during play of the secondary skill-based game 62 to purchase additional items 70.

In one embodiment, the gaming controller 18 displays each item having a different purchased value. The gaming controller 18 may select a paytable based on the value of the item 70 purchased by the player. In addition, the gaming controller 18 may determine a number of targets 64 and/or a value of targets 64 being displayed in the secondary skill-based game 62 based on the value of the purchased item 70. For example, in one embodiment, the gaming controller 18 may select a paytable having a higher value of awards associated with each target 64 when the player purchases a higher value item 70. In addition, the gaming controller 18 may display a greater number of higher value targets 64 when the player purchases a higher value item 70, and display a greater number of lower value targets 64 when the player purchases a lower value item 70. The gaming controller 18 may also provide a predefined number of free items 70 that maybe used by the player during the skill-based game 62, and prompt the player to purchase additional items 70 when the player has played each free item 70.

In the illustrated, the gaming controller 18 tracks a period of time elapsed from the display of the secondary skill-based game 62 and receiving a player selection input to initiate play of the skill-based game 62. In one embodiment, the gaming controller 18 randomly selects an item for use in the secondary skill-based game 62 if the player does not select an item 70 within a predefined period of time. More specifically, the gaming controller 18 selects an item 70 if a player selection input indicative of a player's selection of an item is not received within an elapsed predefined period of time since the display of the secondary skill-based game. In another embodiment, the gaming controller 18 may randomly select a simulated movement associated with the selected item 70 if a player selection input indicative of a player's selection of the item movement is not received within an elapsed predefined period of time since the selection of the item 70.

In another embodiment, the gaming controller 18 is configured to allow a player to make a wager associated with the skill-based game 62 and provide an award determined as a function of secondary skill-based game outcome, the player's wager, and a predetermined paytable. In one embodiment, the gaming controller may allow the player to purchase at least one item from the plurality of player-selectable items using the wager and allow the player to select a movement associated with the selected item 70. The gaming controller 18 may also determine an outcome of the skill-based game as a function of the purchased item 70 and the selected item movement, and provide an award to the player as a function of the skill-based game outcome, the wager, and a paytable.

FIG. 5 is a schematic view of an exemplary gaming system 10. The gaming system 10 includes a system controller 300 and one or more gaming terminals 302 that are coupled to the system controller 300. In one embodiment, the gaming terminal 302 includes the gaming machine 12. In another embodiment, gaming terminal 302 may include a personal computer, laptop, cell phone, smartphone, tablet computer, personal data assistant, and/or any suitable computing device that enables a player to connect to system controller 300 to play the games 60 and 62.

In the illustrated embodiment, the gaming machines 12 and the system controller 300 are coupled in communication with a local area network (LAN) 304. Alternatively, the gaming machines 12 and the system controller 300 may be coupled via a network such as, for example, an Internet link, an intranet, a WAN, dial-in-connections, cable modems, wireless modems, and/or ISDN lines. In one embodiment, the system controller 300 may be implemented by one of the gaming controllers 18 associated with a gaming machine 12. In the illustrated embodiment, the system controller 300 includes a processor 44, a database 46, a memory device 48 coupled to the processor 44 and the database 46, a credit module 50, a random-number generator 52, a display module 54, a player selection module 56, and a target selection module 58. The system controller 300 is configured to perform all of the functions of the gaming controller 18 as described herein.

In the illustrated embodiment, the system controller 300 includes multiple instances of the games 60 and 62 such that each gaming terminal 302 may play a separate instance of the games 60 and 62 simultaneously. Alternatively, the system controller 300 enables players on one or more gaming terminals 302 to simultaneously play the same game.

The above-described systems and methods overcome at least some disadvantages of known gaming machines by providing a system that allows a player to place a wager on a skill-based game, allows the player to affect the outcome of the game via skill-based player selections, and provides an award to the player based on the wager, the game outcome, and a paytable. In addition, the system and methods of the invention are configured to allow the player to play a bingo-type wagering game that includes a bonus feature skill-based game and that allows the player to receive an enhanced award based on the outcome of the skill-based game. By providing a bingo-type game that includes a bonus feature skill-based game that provides an award to the player that may be used for wagering on the bingo-type game, the player's expectation for achieving a win is increased and the enjoyment of the game is improved. Thus, the amount of time that the game is played by patrons of a gaming establishment is thereby increased.

Exemplary embodiments of a gaming machine, a gaming system, and a method of allowing a player to play a game on a gaming machine are described above in detail. The gaming machine, system, and method are not limited to the specific embodiments described herein, but rather, components of the gaming machine and/or system and/or steps of the method may be utilized independently and separately from other components and/or steps described herein. For example, the gaming machine may also be used in combination with other gaming systems and methods, and is not limited to practice with only the gaming machine as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A method of allowing a player to play a game on an electronic gaming device, the electronic gaming device including a processor in communication with a display device, a wager input device configured to receive information relating to a monetary value available for wagering in the game and player wagering selections, a random number generator for facilitating the provision of random outcomes in the primary game and a memory device for storing a game program which when executed by the processor responsive to receiving information relating to a wager causes the processor to operate the display device, the random number generator and the wager input device in connection with the method comprising the steps of:

allowing a player to make a wager selection using the wager input device associated with a primary wagering game and responsively displaying the primary wagering game on the display device;

generating an outcome of the primary wagering game and providing a primary wagering game award to the player as a function of the primary wagering game outcome;

displaying a secondary skill-based game on the display device, the secondary skill-based game including a plurality of targets and a plurality of player-selectable items for use in contacting at least one of the plurality of targets;

allowing the player to select at least one item from the plurality of player-selectable items; allowing the player to select a movement associated with the selected item;

determining an outcome of the secondary skill-based game as a function of the selected item and the selected item movement;

displaying the secondary skill-based game outcome including a simulated movement associated with the selected item in which the selected item is displayed as either contacting a target or not contacting a target;

providing a secondary game award to the player as a function of the secondary skill-based game outcome, wherein the secondary game award includes wagering credits for use in placing a wager in the primary wagering game;

displaying each of the plurality of targets with an associated wagering credit value; and displaying the secondary skill-based game outcome including displaying the selected item contacting at least one target having an associated wagering credit value indicative of the secondary game award.

2. A method in accordance with claim 1, wherein each item of the plurality of items is associated with a different characteristic of simulated movement.

3. A method in accordance with claim 1, wherein the simulated movement includes a trajectory of the selected item from a starting position to an ending position, the method further comprises the step of receiving a player selection input indicative of the trajectory of the selected item.

4. A method in accordance with claim 3, further comprising the steps of: receiving a player selection input indicative of an angle of incline of the selected item measured from a horizontal axis; receiving a player selection input indicative of a launch power associated with the selected item; and determining the item trajectory as a function of the angle of incline and the launch power.

5. A method in accordance with claim 1, further comprising the steps of: determining if a triggering condition occurs in the primary wagering game outcome; and responsively displaying the secondary skill-based game based on the occurrence of the triggering condition.

6. A method in accordance with claim 5, wherein the primary wagering game award includes an amount of wagering credits, the triggering condition being defined as a predefined amount of wagering credits being accumulated during the primary wagering game.

7. A method in accordance with claim 5, wherein the primary wagering game includes a plurality of game symbols being displayed on the display device, the triggering condition being defined as an appearance of a special symbol in the primary wagering game outcome.

8. A method in accordance with claim 1, further comprising the steps of: allowing the player to purchase an item of the plurality of player selectable items; and displaying the secondary skill-based game with the purchased item.

9. A method in accordance with claim 8, wherein the primary wagering game wager includes wagering credits, the method further comprises the step of allowing the player to use wagering credits to purchase the item.

10. A method in accordance with claim 1, further comprising the step of randomly selecting an item for use in the secondary skill-based game if a player selection input indicative of a player's selection of an item is not received within an elapsed predefined period of time since the display of the secondary skill-based game.

11. A method in accordance with claim 1, further comprising the step of randomly selecting a movement of a player selected item if a player selection input indicative of a player's selection of the item movement is not received within an elapsed predefined period of time since the player's selection of the player selectable item.

12. A method in accordance with claim 1, further comprising the step of displaying the secondary skill-based game including the plurality of targets being displayed within a playing field, each of the targets being spaced a distance from the selected item.

13. An electronic gaming machine for displaying a game to a player, comprising: a display device; a user input device configured to generate a signal indicative of a player's selection input and a bill acceptor configured to receive information relating to a monetary value enabled for wagering in the game; and at least one gaming controller coupled to a random number generator for facilitating the provision of random outcomes in the primary game, the display device and the user input device, said at least one gaming controller being operative to: allow a player to make a wager through the user input device associated with a primary wagering game; display the primary wagering game on the display device; generate an outcome of the primary wagering game through communication with the random number generator; provide a primary wagering game award to the player as a function of the primary wagering game outcome; display a secondary skill-based game on the display device, the secondary skill-based game including a plurality of targets and a plurality of player-selectable items for use in contacting at least one of the plurality of targets; allow the player to select at least one item from the plurality of player-selectable items through the user input device; allow the player to select a movement associated with the selected item through the user input device; determine an outcome of the secondary skill-based game as a function of the selected item and the selected item movement; and display on the display device the secondary skill-based game outcome including a simulated movement of the selected item in which the selected item is displayed as either contacting a target or not contacting a target, wherein the gaming controller is further adapted to allow the player to purchase an item of the plurality of player selectable items and display the secondary skill-based game with the purchased item.

14. A gaming machine in accordance with claim 13, wherein the secondary skill-based game outcome includes wagering credits for use in placing a wager in the primary wagering game.

15. A gaming machine in accordance with claim 13, wherein the gaming controller is further adapted to determine if a triggering condition occurs in the primary wagering game outcome and responsively display the secondary skill-based game based on the occurrence of the triggering condition, the triggering condition being defined as a predefined amount of wagering credits being accumulated during the primary game.

16. A method of allowing a player to play a game on a gaming device, the gaming device including a processor in communication with a display device, a wager input device configured to receive information relating to a monetary value and enabled for wagering a wager of monetary value in the game, a random number generator for facilitating the provision of random outcomes in a non-skill based game, and a memory device for storing a game program which when executed by the processor cause the processor to operate with the display device, the random number generator and the wager input device, all in connection with the method comprising the steps of:

allowing a player to make a wager associated with a skill-based game through the wager input device and responsively displaying the skill-based game on the display device, the skill-based game including a plurality of targets and a plurality of player-selectable items for use in contacting at least one of the plurality of targets;

allowing the player to purchase at least one item from the plurality of player-selectable items using the wager input device;

allowing the player to select a movement associated with the selected item;

the processor determining an outcome of the skill-based game as a function of the purchased item and the selected item movement;

displaying on the display device the skill-based game outcome including a simulated movement of the purchased item in which the purchased item is displayed as either contacting a target or not contacting a target; and providing an award to the player as a function of the skill-based game outcome, the award being enabled for wagering through the wager input device.

17. A method of allowing a player to play a game on a gaming device, the gaming device including a processor in communication with a display device, a wager input device configured to receive information relating to a monetary value available for wagering in the game and player wagering selections before, during and after game play, a random number generator for facilitating the provision of random outcomes in the primary game and a memory device for storing a game program which when executed by the processor cause the processor to operate with the display device, the random number generator and the wager input device, the method comprising the steps of:

allowing a player to make a wager selection through the wager input device associated with a primary wagering game and responsively displaying the primary wagering game on the display device;

the random number generator generating an outcome of the primary wagering game and providing a primary wagering game award to the player as a function of the primary wagering game outcome, wherein the award is enabled for wagering using the wager input device;

displaying a secondary skill-based game on the display device, the secondary skill-based game including a plurality of targets and a plurality of player-selectable items for use in contacting at least one of the plurality of targets;

allowing the player to purchase at least one item from the plurality of player-selectable items, wherein the purchase reduces the monetary value available for play;

allowing the player to select a movement associated with the purchased item;

the processor determining an outcome of the secondary skill-based game as a function of the purchased item and the purchased item movement; and displaying on the display device the secondary skill-based game outcome including a simulated movement associated with the purchased item in which the purchased item is displayed as either contacting a target or not contacting a target.

18. A method in accordance with claim 17, wherein the primary wagering game wager includes wagering credits, the method further comprises the step of allowing the player to use wagering credits to purchase the item.

19. A method in accordance with claim 17, further comprising the step of displaying the secondary skill-based game including the plurality of targets being displayed within a playing field, each of the targets being spaced a distance from the purchased item.

* * * * *